(No Model.)
J. JENKINS.
TIRE FOR BICYCLES.
No. 576,194. Patented Feb. 2, 1897.
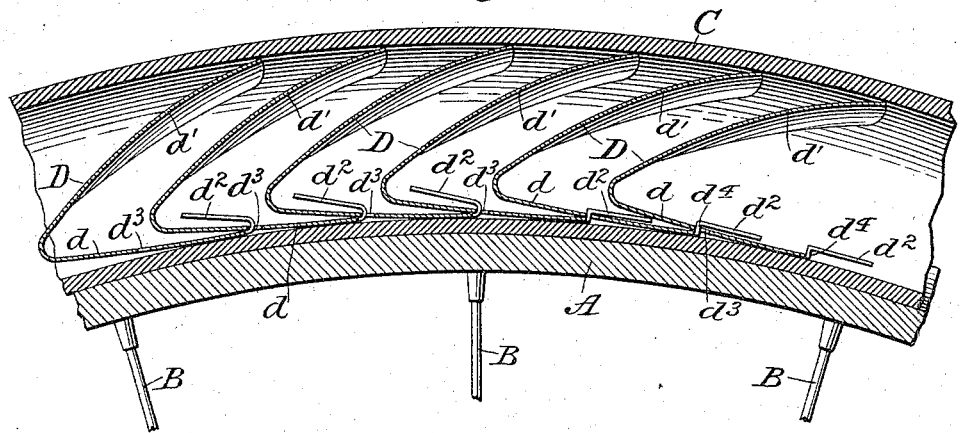
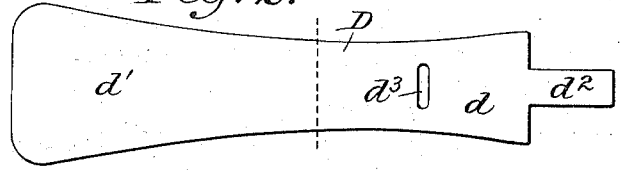
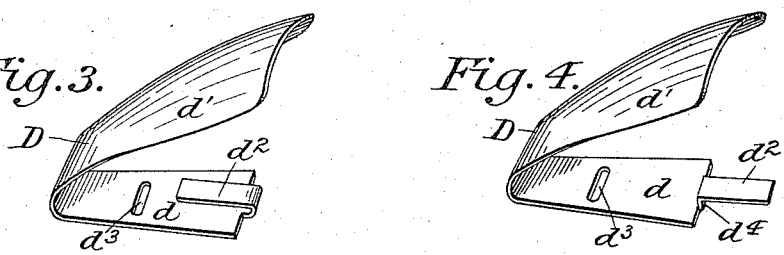 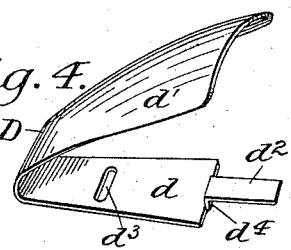
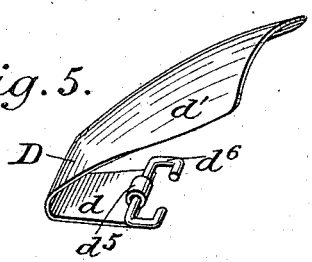
Attest:
A. N. Jesbera.
Chas. E. Epworth.
Inventor:
Joel Jenkins
by Redding, Kiddle & Greeley
Attys.

UNITED STATES PATENT OFFICE.

JOEL JENKINS, OF MONTCLAIR, NEW JERSEY.

TIRE FOR BICYCLES.

SPECIFICATION forming part of Letters Patent No. 576,194, dated February 2, 1897.

Application filed June 5, 1896. Serial No. 594,353. (No model.)

*To all whom it may concern:*

Be it known that I, JOEL JENKINS, a citizen of the United States, residing in Montclair, in the county of Essex, in the State of New Jersey, have invented certain new and useful Improvements in Tires for Bicycles, &c., of which the following is a specification, reference being had to the accompanying drawings, forming a part hereof.

This invention relates to the construction of tires for bicycles, sulkies, light carriages, and other vehicles of the like general class which require to be provided with tires which are at once soft and yielding in a measure and possessed of a high degree of resilience. Such tires, as is well understood, are usually pneumatic tires, either of the single-tube variety or of the double-tube variety, these being exceedingly well adapted for their intended use, except that they are liable at any time to be rendered useless, at least for the time being, by the puncturing of the air-containing tube. Various means have been devised hitherto for the purpose of providing a protective sheath or armor for such tires which should prevent the puncturing of the air-containing tube, but such devices or means, so far as they are known to me, not only add considerably to the weight of the tires and affect their resilience in an undesirable manner, but are for the most part only partially affected, reducing the liability to puncture, it is true, but not guarding with certainty against its occurrence. I have therefore sought to provide means for at all times insuring the proper degree of resilience of tubular tires without adding materially to the weight or detracting from their desirable qualities, which means shall be independent of the integrity of the outer case or tube and shall be applicable, substantially like an ordinary inner tube, to any outer case or tube, no attachment to the body of the wheel itself being necessary or desirable. Such means consist, essentially, of a series of springs connected together to form a flexible chain.

I will proceed to describe the particular form in which at the present I deem it most advantageous to embody my invention, with reference to the accompanying drawings, in which—

Figure 1 is a central longitudinal section of a short length of tire to which my improvements have been applied, a portion of the body of the wheel being also represented. Fig. 2 is a plan view of one of the blanks from which the springs are bent up, as represented in Fig. 1. Fig. 3 is a perspective view of one of the springs shown at the left in Fig. 1. Fig. 4 is a perspective view of one of the springs shown at the right in Fig. 1. Fig. 5 is a perspective view illustrating a slightly-different manner of connecting the springs from that shown in Fig. 1.

The wheel to which my improved tire may be applied may be of any usual or suitable construction, a concave rim A and wire spokes B B being indicated in Fig. 1. The tube or case C of the improved tire may also be of any ordinary or suitable construction, being a flexible tube adapted to afford the suitable contact-surface with the ground and a suitable surface for attachment to the rim A of the wheel. It is not necessarily an air-tight tube, and it may be in all respects practically like the outer tube of an ordinary double-tube tire, which is usually provided at some point on its inner surface with a laced opening to permit the insertion and removal of the inner tube, as is well understood.

My invention is particularly concerned with the means which are applied within the tube C to cause the latter to retain its shape and to impart thereto the proper degree of resilience. Such means comprise a series of springs D D, which are connected together to form a flexible chain, each spring in action being independent of every other spring except when it is compressed to such an extent as to require the coöperation and support of the spring or springs next to it. As represented in the drawings, I prefer to make each spring D a leaf-spring substantially V-shaped, one member $d$ of the spring being adapted to rest against the inner portion of the tube or case C, that is to say, that portion of the tube which rests against the rim of the wheel, the spring being in this manner supported by the said rim. It will be obvious that if the case C were not a complete tube, but were made to engage at its edges with the edges of the rim A, as is the case in some double-tube tires, the springs will be supported directly upon the rim of the wheel, although not being connected thereto. The other member $d'$ is adapted to support the outer portion or tread of the tube or case C and is preferably curved somewhat both longitudinally and transversely, so that it may properly support the outer portion of the tire without danger of cutting or wearing through the same from the inside. The springs formed in this manner may be connected together to form a flexible chain in many different ways.

In Figs. 1, 2, 3, and 4 I have represented each spring as formed with a tongue $d^2$, projecting from the member $d$, and with a slot $d^3$ in the same member. To unite the several springs, the tongue $d^2$ may be inserted through the slot $d^3$ of the next spring from the under side and turned over upon the member $d$ of that spring, as represented at the left in Fig. 1, or the tongue may be formed with a shoulder or offset $d^4$, as represented in Fig. 4, to engage the member $d$ of the next spring, as clearly represented at the right in Fig. 1. The tongue of the member $d$ might also be bent over to form an eye $d^5$, as shown in Fig. 5, to receive a wire loop $d^6$, which engages the bend of the next spring, but I prefer that the springs shall overlap in the manner represented in Fig. 1.

It will be evident that the independent springs might be connected loosely together in many different ways, the object being to make a flexible chain of the springs, while permitting each spring to act without restraint. If the members $d'$ $d'$ of the successive springs overlap somewhat, it will be evident that when any one spring is compressed beyond a certain point it will receive the support and cooperation of the next spring to it, thereby preventing an excessive flattening of the tire at any point, while retaining the delicacy of each spring as it is slightly compressed.

In applying my improvement to a tire a chain of springs of a proper length is made up, and if the chain is to be employed in connection with an outer tube it is drawn through such outer tube in the ordinary manner of inserting an inner tire, and the two ends of the chain are then joined together by inserting the tongue of one end spring through the slot of the other in the manner already described. If the outer case C is not a tube, the ends of the chain can be united, the chain applied directly to the rim of the wheel, and the outer case applied subsequently.

It will of course be understood that I do not intend to confine myself to the precise form and arrangement of the spring which I have herein shown and described, other forms and arrangements being within the purview of my invention.

I claim as my invention—

1. A tire for bicycles, &c., having an outer case or covering and an inner flexible chain of independent leaf-springs loosely connected one with another, substantially as shown and described.

2. The combination with a wheel-rim and a tubular case or cover of a chain of separate springs loosely connected together and inserted through said tubular case or cover and independently operating, substantially as shown and described.

3. A yielding, resilient support for the tread of a tire for bicycles, &c., consisting of a flexible chain of V-shaped springs having one member to rest against the wheel-rim and the other member to support the tread of the tire, said springs being loosely connected, substantially as shown and described.

4. A yielding, resilient support for the tread of a tire for bicycles, &c., consisting of a flexible chain of V-shaped springs having one member to rest against the wheel-rim and the other to support the tread of the tire, the first-named member of each spring having a tongue to enter and engage a slot in the corresponding member of the next spring, substantially as shown and described.

This specification signed and witnessed this 2d day of June, A. D. 1896.

JOEL JENKINS.

In presence of—
C. M. LAMPREY,
KATE O. LAMPREY.